United States Patent [19]

Provencher et al.

[11] Patent Number: 5,080,715
[45] Date of Patent: Jan. 14, 1992

[54] RECOVERING CLEAN METAL AND PARTICULATES FROM METAL MATRIX COMPOSITES

[75] Inventors: Robert Provencher; Gaston Riverin, both of Jonquière, Canada

[73] Assignee: Alcan International Limited, Montreal, Canada

[21] Appl. No.: 609,434

[22] Filed: Nov. 5, 1990

[51] Int. Cl.$^5$ ............................................. C22B 21/00
[52] U.S. Cl. .......................................... 75/708; 75/680; 75/683; 266/217
[58] Field of Search ........................ 75/708, 680, 683; 266/217

[56] References Cited

U.S. PATENT DOCUMENTS

| | | | |
|---|---|---|---|
| 4,191,559 | 3/1980 | Van Linden | 75/680 |
| 4,470,846 | 9/1984 | Dubé | 75/685 |
| 4,775,319 | 9/1988 | Otsuka | 75/680 |

Primary Examiner—Peter D. Rosenberg
Attorney, Agent, or Firm—Cooper & Dunham

[57] ABSTRACT

A process is described for removing all reinforcing particles contained in metal matrix composite scrap materials. This new technique involves providing a treatment vessel for holding a melt of an aluminum matrix composite to be recycled. Heating means are provided for heating the contents of the vessel to a temperature in the range of 700°–750° C. Mixing of the melt is carried out by means of a power driven vaned rotary impeller and this impeller is operated under different conditions for different stages of the process. In the first mixing stage, the impeller is operated under vortex-forming conditions and a fluxing salt is added to the melt while a gas is injected through a gas outlet beneath the surface of the melt and near the rotating impeller. This causes the salt to rapidly mix with the melt and the inlet gas, providing a uniform distribution through the melt of gas bubbles each surrounded by a layer of liquid salt. As a second stage of the treatment process, the impeller is operated at a high differential velocity between the impeller and the melt. These conditions cause collisions between the salt-coated bubbles and wetted reinforcing particles such as to de-wet the reinforcing particles and cause the reinforcing particles and salt flux to rise to the surface of the melt. The surface layer that is formed is essentially a powder which can easily be removed leaving a substantially pure metal with its chemical composition unchanged.

14 Claims, 1 Drawing Sheet

RECOVERING CLEAN METAL AND PARTICULATES FROM METAL MATRIX COMPOSITES

BACKGROUND OF THE INVENTION

This invention relates to the recovery or reclaiming of substantially pure metal from metal matrix composites and, more particularly, to a process for recovering substantially pure aluminum from aluminum matrix composites and also recovering the reinforcing particulates.

Aluminum matrix composites are widely used where high strengths and other enhanced properties are required in castings. As materials for reinforcing the aluminum matrix, a variety of non-metallic particulates are typically used, e.g. ceramic particles, such as silicon carbide, alumina, etc. in amounts in the range of 10 to 30% by volume.

In processes in which the aluminum matrix composites are utilized, there is a proportion of waste or scrap materials. The scrap from these metal matrix composites represents a serious disposal problem since metal matrix composites cannot be incorporated into standard alloys on account of the danger of contamination by the reinforcing particles present. For instance, a metal matrix composite containing even a very low concentration of ceramic particulates could have disastrous effects if mixed with metal destined for thin gauge rolled products, such as can stock.

The injection of a reactive gas or an inert-reactive gas mixture into molten metal is a commonly used technique for the removal of contaminants, including solids. Such systems are described for instance in Bruno et al, U.S. Pat. No. 3,839,019, Szekely, U.S. Pat. No. 3,743,263, Withers et al, U.S. Pat. No. 4,634,105 etc. These prior systems are based upon injecting gas in the form of small discrete bubbles into a melt and these small bubbles are intended to float or dewet a substantial proportion of any solid contaminants contained in the molten metal and remove other contaminants, such as dissolved hydrogen, in the melt.

While such processes are quite effective, they are not capable of removing all reinforcing particulates from the matrix such that the metal portion can be reused as a pure material.

The use of a molten salt bath in a rotary furnace is a more usual way of removing non-metallic inclusions from aluminum scrap. However, a large quantity of salt (e.g. about 20-50% by weight) would be needed to remove all the ceramic particulate from a metal matrix composite. This would not be environmentally acceptable.

It is the object of the present invention to provide a simple process for removing all solid particles contained in metal matrix composite scrap materials.

SUMMARY OF THE INVENTION

According to the present invention it has been found that the above object can be achieved by a very special procedure which successfully dewets all of the reinforcing particles, e.g. ceramic particles, in the melt so that they may be separated. This new technique involves providing a treatment vessel for holding a melt of a metal matrix composite to be recovered. Heating means are provided for heating the contents of the vessel to a temperature in the range of 700°-750° C. Mixing of the melt is carried out by means of a power driven vaned rotary impeller and this impeller is operated under different conditions for different stages of the process. In the first mixing stage, the impeller is operated under vortex-forming conditions and a fluxing salt is added to the melt while a gas is injected through a gas outlet beneath the surface of the melt and near the rotating impeller. This causes the salt to rapidly mix with the melt and the inert gas, providing a uniform distribution through the melt of gas bubbles each surrounded by a layer of liquid salt. As a second stage of the treatment process, the impeller is operated at a high differential velocity between the impeller and the melt. These conditions cause collisions between the salt-coated bubbles and wetted reinforcing particles such as to de-wet the ceramic particles and cause the particles and salt flux to rise to the surface of the melt. The surface layer that is formed is essentially a powder which can easily be removed leaving a substantially pure metal with its chemical composition unchanged.

In the first stage of mixing, where a vortex is required, it is preferable that the impeller be positioned substantially centrally within the treatment vessel. In the second stage of treatment where a high differential velocity is required with only limited vortex formation, it is preferable to position the axis of the mixing impeller in a location offset from the central axis of the treatment vessel. Preferably, the mixing impeller is located with its axis about one half of the distance between the central axis and the side wall of the vessel for the second mixing stage.

The salts which are used in the process of this invention are typical foundry salts for the aluminum industry and these salts in molten form must be thermodynamically stable in the presence of liquid aluminum. Thus, the salt phase must be capable of wetting the reinforcing particles while not itself being wetted by the liquid aluminum phase. The reinforcing particles which come into contact with the salt phase can be adsorbed at the interface or may be absorbed into the salt phase, resulting in their removal from the metal. A reduction in surface tension between the salt and the metal is desirable since it brings about the absorption of the reinforcing particles into the salt phase, which is the more efficient means for removal of such particles.

The salt is preferably an alkali metal halide salt or mixtures of such salts, and chloride and/or fluoride mixtures are preferred. A typical salt comprises a mixture of sodium chloride and potassium chloride with other minor components. The salt is preferably added to the melt in an amount of about 0.05 to 1.5 percent by weight, depending upon the nature of the reinforcing particles to be removed. Thus, about 1.5% by weight of salt is required to remove silicon carbide particles, while the alumina particles can be removed with about 0.1% by weight of salt. The salt or salts can be added to the melt preferably in the form of a solid mixture.

The gas being injected into the melt is primarily an inert gas. The treatment gas must be free of moisture and as inert gas, any gas may be used which is substantially non-reactive toward liquid aluminum at reaction temperatures, e.g. argon or nitrogen. However, argon is preferred. The reactive gas may be added together with the inert gas for efficient operation. Treatment gas flow rates of about 12 l/min are preferably used for a 300 kg melt, while about 10 l/min can be used for a 100 kg melt.

It is important that the gas be injected well beneath the surface of the melt and it should also be injected close to the impeller so that there is a strong shearing action to break up the gas into small, well distributed bubbles. The gas may be injected through a hollow rotor with an outlet for the gas at the bottom end of the impeller rotor or the gas may be injected by being discharged through an opening in the rotor in the vicinity of the impeller vanes. Alternatively, a separate injection lance may be used having an outlet close to the impeller vanes.

The mixing device is preferably made from graphite, silicon carbide or a ceramic material which is inert to the molten metal. It comprises an impeller consisting of a central hub portion with radially projecting vanes set to provide substantial shearing action. They are preferably inclined at an angle of 30° to 90°. The ratio of the impeller diameter to the diameter of the vessel is preferably about 1:2.5 to 1:4 and the impeller blades preferably have an axial height:diameter ratio of about 1:2 to 1:6. The impeller typically has about 4–6 vanes.

The impeller is typically operated at a rate of about 100–250 rpm. In a preferred operation, the first mixing stage is at about 200 rpm, while the second mixing stage is at about 250 rpm.

It is preferable that the temperature of the melt be maintained generally below 750° C. At temperatures above 750° C., there is an increase in the rate of reaction of aluminum with silicon carbide reinforcing particles to form aluminum carbide, while releasing silicon into the melt. This tends to change the chemical composition of the aluminum. The initial mixing stage is preferably continued for a period of time in the order of about 2 to 5 minutes. It should be discontinued when the gas bubbles have been well distributed throughout the entire melt. The second mixing stage is preferably continued for a period of time of up to about 25 minutes, depending upon the nature of the reinforcing particles being removed. For instance alumina particles are fully removed in about 10 minutes, while the silicon carbide particles require about 20 minutes.

The process of the invention is of great value to fabrication plants and end users where process scrap is generated.

According to a further feature of this invention, the particulate reinforcing material may also be recovered and used again, e.g. in the ceramic industry. As stated above, the dewetted particles move up to the surface of the melt, forming a surface layer consisting of a powder containing the removed reinforcing particles and the salt. This layer of powder is removed and the salt is leached out with hot water, leaving the reinforcing particles, i.e. alumina or silicon carbide.

BRIEF DESCRIPTION OF THE DRAWINGS

The invention is illustrated by way of example with reference to the drawings in which.

Figure 1:
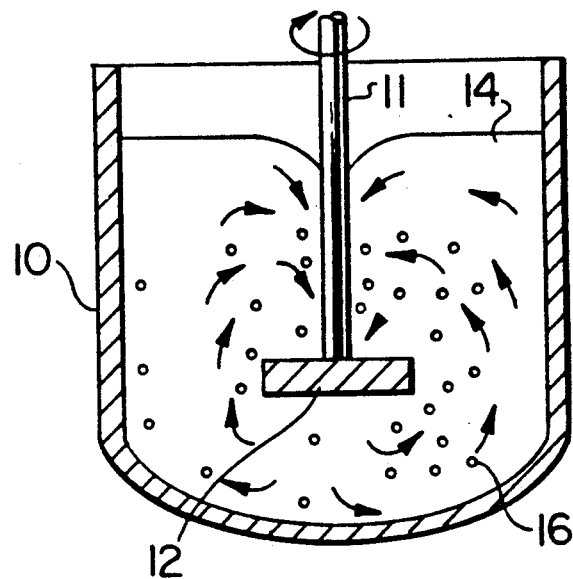
FIG. 1 is a vertical section of one form of treatment vessel for carrying out the invention.
Figure 2:
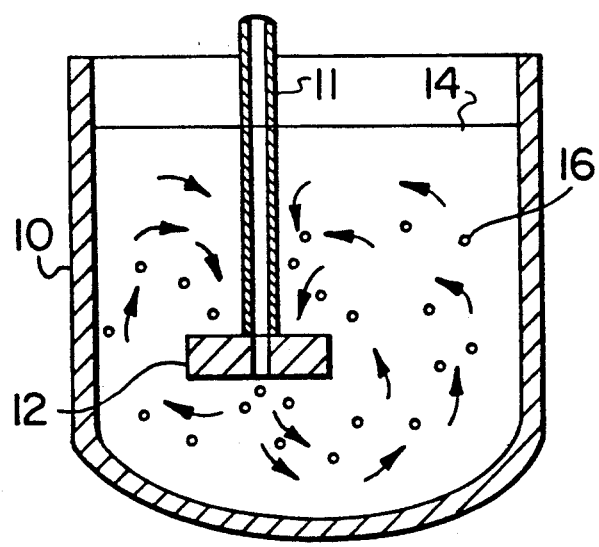
FIG. 2 is a view similar to FIG. 1 with the impeller off-set.
Figure 3:
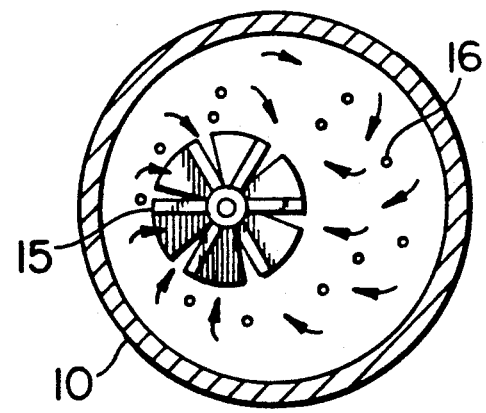
FIG. 3 is a horizontal section of the device of FIG. 2.

A suitable arrangement for carrying out the invention is depicted in FIGS. 1, 2 and 3 wherein a vessel 10 is provided which may conveniently be a furnace used for melting aluminum foundry alloys for sand or gravity die casting. The vessel does not require a cover, although one may be used. The vessel is preferably circular in cross section and typically has a diameter of about 65–75 cm. The vessel contains a molten metal matrix composite 14 and the depth of the melt is typically about equal to the diameter of the vessel.

Extending down into the molten composite is a rotatable mixer consisting of a hollow rotatable drive shaft 11 with an impeller 12 with radially projecting vanes 15 at the bottom thereof. The impeller typically has a diameter of about 20 cm across the vanes 15 with each vane having an axial height of about 7 cm. The impeller shown has six vanes 15 set at an angle of 45° to the horizontal.

FIG. 1 shows the mixer arrangement for the first mixing stage with the impeller 12 axially centered in the vessel 10. The second mixing stage is shown in FIGS. 2 and 3 with the impeller 12 off-set about half the distance between the central axis and the outer wall of the Vessel.

EXAMPLE 1

Tests were conducted using two different aluminum alloy matrix composites, one consisting of AA 6061 matrix containing 15% by volume of alumina particles and the other consisting of A 356 matrix containing 15% by volume of silicon carbide particles.

The treatment system was the type shown in FIGS. 1–3 with an impeller having six vanes set at 45° and having a diameter approximately half that of the heating vessel. A 300 kg charge of a composite was heated to 725° C. and with the impeller positioned at the central axis of the furnace and rotating at 200 rpm, argon gas was fed down the hollow impeller shaft at a rate of about 12 l/min and a salt flux was added to the melt.

The salt used for all tests had the following composition:

45% NaCl
45% KCl
5% CaSO$_4$
5% impurities

Other types of salt were also investigated but the results showed that the salt composition did not significantly affect the yield from the process. This mixture was therefore chosen because of its cost and the absence of fluoride.

Mixing was continued under vortex-forming conditions for about 4 minutes, after which the impeller was stopped and shifted to a location about one half the distance between the central axis and the wall of the heating vessel. In this off-set position, the impeller was rotated at 250 rpm, but with limited vortex formation. This mixing was continued for about 7 minutes, at which point the reinforcing particles in the melt were totally dewetted and a dry powder layer formed on the surface of the melt. The powder was removed, leaving aluminum alloy free of any reinforcing particles. The processing conditions and results are shown in Table 1:

TABLE 1

| | Recovery Results | |
| --- | --- | --- |
| | Type of reinforcement agent | |
| Conditions | Al$_2$O$_3$ | SiC |
| Metal Matrix | AA6061 | A356 |
| Particles -% volume | 15 | 15 |
| Salt used -% weight* | 0.1 | 1.5 |
| Aluminum recovered -% weight** | 90 | 90 |

TABLE 1-continued

| | Recovery Results | |
|---|---|---|
| | Type of reinforcement agent | |
| Conditions | $Al_2O_3$ | SiC |
| Powdered product -% weight* | 30 | 30 |

*% = weight/total weight of the load
**% = weight recovered aluminum/calculated weight of metal matrix

RECOVERED ALUMINUM

For each of the tests, chemical analyses and cleanliness evaluation of the recovered metal were carried out. The results of the chemical analyses demonstrated that the process did not lead to contamination of the alloy by Na, Ca or other products and did not affect the concentration of other elements.

Table 2 shows the concentrations of the main alloy components before and after processing, for the MMC alloy from casting A356-15% SiC and AA6061-15% $Al_2O_3$. The analyses for composition before processing were done by ICP and those after treatment by optical emission spectroscopy.

TABLE 2

Chemical compositions of aluminum before and after treatment

| | Alloy | | | |
|---|---|---|---|---|
| | A356 | | AA6061 | |
| Element | Before Treatment | After Treatment | Before Treatment | After Treatment |
| Fe | 0.1 | 0.1 | 0.24 | 0.26 |
| Si | 6.8 | 7.0 | 0.61 | 0.65 |
| Mg | 0.35 | 0.30 | 0.70 | 0.69 |
| Ca | 0.0003 | 0.0003 | 0.0003 | 0.0003 |
| Na | 0.0004 | 0.0005 | 0.0004 | 0.0005 |
| Ti | 0.10 | 0.11 | 0.10 | 0.12 |
| Sr | 0.0003 | <0.0001 | 0.0004 | <0.0001 |

As for the cleanliness of the metal, filtration analyses were carried out on the recovered aluminum which showed the cleanliness levels corresponded to those for commercial alloys from foundry or extrusion plant as the case may be. The aluminum has thus been freed from the ceramic particles and no longer shows characteristics of contamination. The trace impurities remaining are those such as $Al_4C_3$, $TiB_2$, MgO and spinels. Of these, only $Al_4C_3$ may be related to to the process due to the reaction referred to on page 4, lines 33-34.

RECOVERED RESIDUES

At the same time, chemical and XRD analyses were made on the residues resulting from the process, in order to know the composition of the powder. In the case of alumina-based MMC alloys, the composition of the residue is as follows (% wt/wt of powder):
  65% Alumina
  32% Aluminum
  3% Salt In the case of silicon carbide-based MMC alloys, the composition is the following:
  65% SiC
  32% Aluminum
  3% Salt The aluminum found in the residues was in the form of fine droplets which can be recovered in a large proportion by a mechanical straining process. Microscopic analyses of the recovered ceramic particles (alumina and SiC showed that no major alteration has occurred except that a few salt crystals could be detected on the surface, which can easily be dissolved in an aqueous solution.

EXAMPLE 2

A further test was carried out using the same salt flux and treatment equipment as in Example 1. The composite was a Duralcan aluminum alloy composite containing 15% by volume of alumina particles.

A composite charge of 258 kg was added to the treatment vessel and heated to 725° C. Argon was fed into the melt at a rate of 12.5 l/min with the impeller rotating at 200 rpm and 250 g (0.1 wt %) of the salt flux were added. Mixing under vortex-forming conditions was continued for 4 minutes and then the second stage mixing with the impeller rotating at 250 rpm in off-set position was continued for 7 minutes. The reinforcing particles and salt formed a powder layer on the surface of the melt and this was removed, leaving aluminum alloy free of reinforcing particles.

The chemical composition of the aluminum alloy before and after treatment is shown in Table 3:

TABLE 3

| Element | Before treatment (%) sample #R2-0 | After treatment (%) sample #R2-1 |
|---|---|---|
| Cu | 0.24 | 0.28 |
| Fe | 0.18 | 0.19 |
| Mg | 0.69 | 0.72 |
| Mn | 0.004 | 0.004 |
| Ni | 0.008 | 0.007 |
| Si | 0.70 | 0.75 |
| Ti | 0.14 | 0.11 |
| Zn | 0.004 | 0.004 |
| Cr | 0.090 | 0.10 |
| Be | 0.0017 | 0.0009 |
| Cd | <0.001 | <0.001 |
| Co | <0.001 | <0.001 |
| Sr | 0.0003 | <0.0001 |
| V | 0.014 | 0.015 |

The cleanliness of the aluminum alloy was also measured using the PoDFA technique. In this latter test system (porous disc filtration apparatus) a sample of at least 1 Kg of molten aluminum is forced under pressure through a porous ceramic filter disc which will retain all solid inclusion of greater than a predetermined size. Some metal is allowed to remain on the disc and permitted to freeze. The disc and the sample are then sectioned and polished and the section examined microscopically by a trained observer.

The results obtained are shown below.

| | Sample number | |
|---|---|---|
| | R2-1 | R2-2 |
| Inclusions per mm2/kg | 0.22 | 0.06 |
| Oxide films Nb/kg | 0 | 0 |

We claim:

1. A process for recovering substantially pure aluminum or aluminum alloy from an aluminum matrix composite containing solid reinforcing particles, comprising the steps of:
   (a) providing a melt of the aluminum matrix composite in a treatment vessel,
   (b) heating the melt in the vessel to maintain a temperature in the range of 700°-750° C.,
   (c) mixing the melt with a vaned rotary impeller, (d) treating the melt while mixing firstly under vortex-forming conditions by adding afluxing salt to the melt and injecting a gas through a gas outlet beneath the surface of the melt and near the rotating impeller whereby the salt is rapidly mixed with the melt and the inert gas, providing a uniform distribution through the melt of gas bubbles each surrounded by a layer of liquid salt, (e) treating the mixture from part (d) by secondly mixing while operating the impeller at a higher differential velocity between the impeller and the melt than the differential velocity of the first mixing to thereby cause collisions between the salt coated bubbles and wetted reinforcing particles such as to de-wet the reinforcing particles and cause the reinforcing particles and salt flux to rise to the surface of the melt in the form of a layer of dry powder and (f) recovering a melt of substantially pure aluminum or aluminum alloy.

2. A process according to claim 1 wherein the salt comprises an alkali metal halide salt.

3. A process according to claim 2 wherein the salt is a chloride or fluoride mixture.

4. A process according to claim 2 wherein the salt comprises a mixture of NaCl+KCl.

5. A process according to claim 1 wherein the salt is added in an amount of 0.05 to 1.5 percent by weight.

6. A process according to claim 5 wherein the gas is an inert gas.

7. A process according to claim 6 wherein the reinforcing particles are alumina or silicon carbide.

8. A process according to claim 1 wherein the treatment vessel has a substantially circular cross-section and the ratio of the impeller diameter:vessel diameter is about 1:2.5 to 1:4.

9. A process according to claim 8 wherein for the first mixing stage the impeller is positioned approximately centrally in the vessel.

10. A process according to claim 9 wherein for the secondary mixing stage the impeller is positioned axially off-center.

11. A process according to claim 10 wherein the impeller is rotated at about 200 rpm in the first mixing stage and about 250 rpm in the second mixing stage.

12. A process according to claim 1 wherein the layer of dry powder is removed from the surface of the melt.

13. A process according to claim 12 wherein the salt is leached out of the powder, leaving substantially pure reinforcing particles.

14. A process according to claim 13 wherein the reinforcing particles are ceramic particles.

* * * * *